US005151954A

United States Patent [19]

Takai et al.

[11] Patent Number: 5,151,954

[45] Date of Patent: Sep. 29, 1992

[54] DEVICE CAPABLE OF MODIFYING A CHARACTER ACCORDING TO A SELECTED ATTRIBUTE CODE

[75] Inventors: Kazuhito Takai, Tokyo; Yukihiro Kimura, Gunma, both of Japan

[73] Assignee: NEC Corporation, Tokyo, Japan

[21] Appl. No.: 633,608

[22] Filed: Dec. 20, 1990

[30] Foreign Application Priority Data

Dec. 26, 1989 [JP] Japan .................. 1-337333

[51] Int. Cl.[5] .................. G06K 9/36

[52] U.S. Cl. .................. 382/41; 340/723; 340/735; 382/44; 395/109; 395/151

[58] Field of Search .................. 382/41, 44, 45, 46, 382/47; 340/701, 703, 723, 731, 735; 364/518, 519; 395/100, 109, 110, 144, 150, 151

[56] References Cited

U.S. PATENT DOCUMENTS

| | | | |
|---|---|---|---|
| 4,692,758 | 9/1987 | Fawcett et al. | 340/735 |
| 4,729,107 | 3/1988 | Hasegawa et al. | 364/518 |
| 4,827,254 | 5/1989 | Nishiyama | 340/735 |
| 4,849,748 | 7/1989 | Katsuta | 340/735 |
| 4,868,554 | 9/1989 | Aoki et al. | 340/703 |
| 4,995,089 | 2/1991 | Altrieth, III | 382/46 |

*Primary Examiner*—Joseph Mancuso
*Attorney, Agent, or Firm*—Whitham & Marhoefer

[57] ABSTRACT

For use in a character display device, a modifying device comprises first and second memories. The first memory memorizes a character code representative of a character which should be displayed. The second memory memorizes an attribute or characteristic code and a selection code which cooperatively determine modification of the character. The character code, the attribute code and the selection code are read out of the first and the second memories by an address signal which is supplied from a supplying section. Responsive to the character code, a character pattern generating circuit generates a character pattern to supply the character pattern to first through N-th modifying circuits, where N represents a positive integer which is not less than two. Responsive to the attribute code, the first through the N-th modifying circuits modify the character pattern into first through N-th modification signals, respectively, to supply the first through the N-th modification signals to a selecting circuit. Responsive to the selection code, the selecting circuit selects at least one of the first through the N-th modification signals as a modified signal representative of the character with modification.

4 Claims, 2 Drawing Sheets

DEVICE CAPABLE OF MODIFYING A CHARACTER ACCORDING TO A SELECTED ATTRIBUTE CODE

BACKGROUND OF THE INVENTION

This invention relates to a character modifying device which is for modifying a character into a modified signal and is used in a character displaying device for displaying the modified signal.

On displaying a character on a displaying device, it is often desirable to modify the character into a modified signal in order to display a modified character. To this end, a conventional displaying device comprises a modifying section for modifying the character into the modified signal in response to an attribute code which determines modification of the character.

The attribute code is memorized in an attribute memory and is read out of the attribute memory according to a character code representative of the character.

However, modification of the character is determined only by the attribute code in the conventional displaying device. That is, it is difficult to vary the attribute code as desired.

SUMMARY OF THE INVENTION

It is therefore an object of the present invention to provide a modifying device which is capable of varying an attribute code which determines modification of a character.

According to this invention, there is provided a modifying device for modifying a character into a modified signal. The modifying device comprises a first memory for memorizing a character code representative of the character, a second memory for memorizing an attribute code and a selection code which cooperatively determine modification of the character, supplying means for supplying an address signal to the first and the second memories to read out the character code, the attribute code, and the selection code, a character pattern generating circuit responsive to the character code read out of the first memory for producing a character pattern, first through N-th modifying means responsive to the attribute code read out of the second memory for modifying the character pattern into first through N-th modification signals, respectively, where N represents a positive integer which is less than two, and selecting means for selecting at least one of the first through the N-th modification signals as the modified signal in response to the selection code read out of the second memory.

DESCRIPTION OF THE PREFERRED EMBODIMENT

Figure 1:
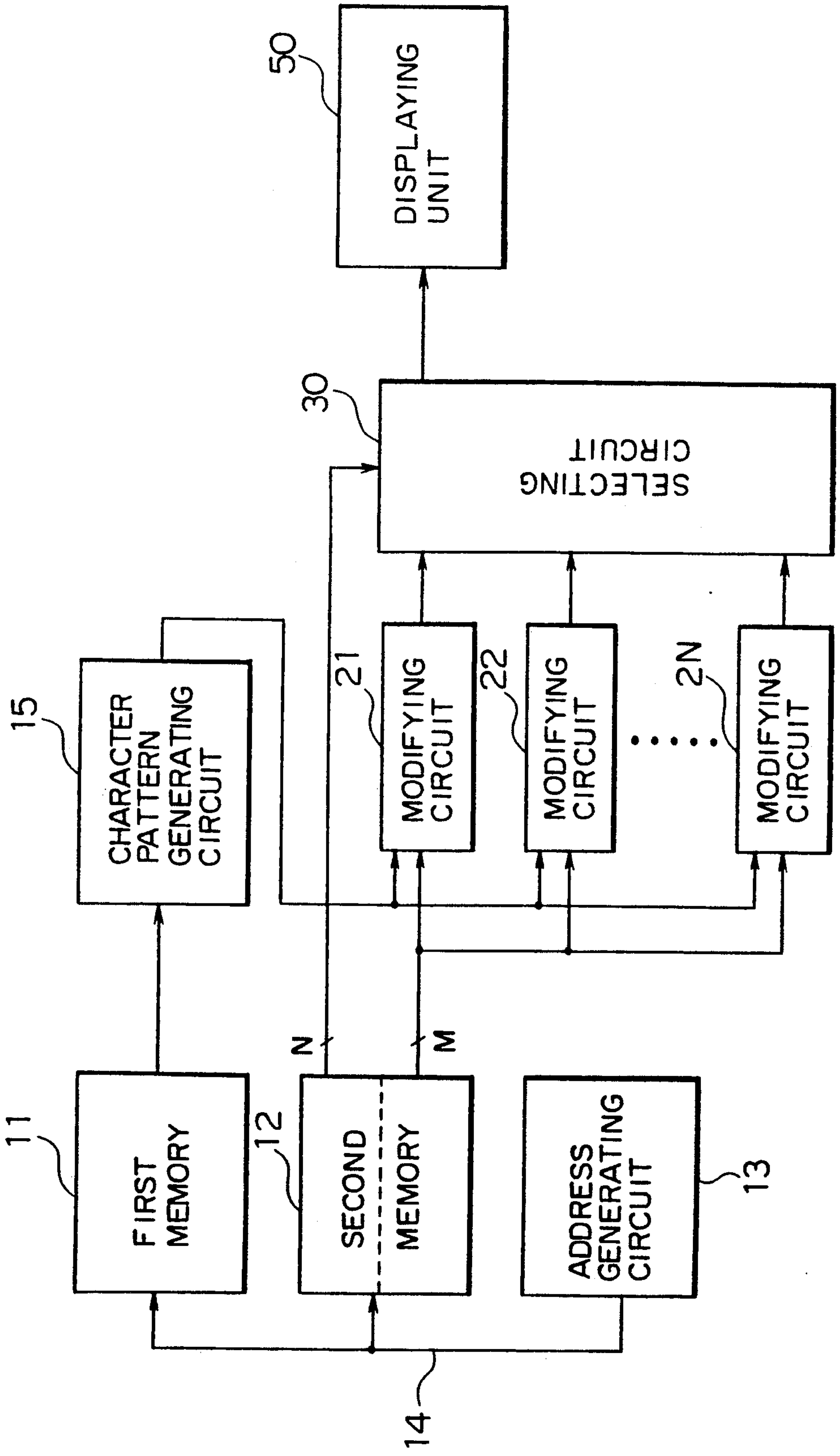
FIG. 1 is a block diagram of a display device which comprises a modifying device according to an embodiment of this invention.

Referring to FIG. 1, a display device comprises a modifying device for modifying a character into a modified signal and is for displaying the modified signal as a modified character. The modifying device comprises first and second memories 11 and 12. The first memory 11 memorizes a character code representative of the character. The second memory 22 memorizes a modifying code which determine modification of the character. The modifying code comprises an attribute code and a selection code as will be described hereinafter. Although the first and the second memories 11 and 12 may memorize a plurality of character codes and modifying N characteristic codes, respectively, description will proceed as regards a case where the first and the second memories 11 and 12 memorize one character code and one modifying code, respectively.

On displaying the modified character, an address generating circuit 13 generates an address signal. The address signal is supplied to the first and the second memories 11 and 12 by a supplying path 14. When the address signal is supplied to the first memory 11, the character code is read out of the first memory 11 and is supplied to a character pattern generating circuit 15. The character pattern generating circuit 15 produces a character pattern signal in response to the character code to deliver the character pattern signal to first through N-th modifying circuits 21 to 2N, where N represents a positive integer which is not less than two. In the example being illustrated, N is equal to eight.

When the address signal supplied to the second memory 12, the modifying code is read out of the second memory 12. The modifying code comprises the attribute code which consists of first through M-th bits, where M represents a positive integer which is not less than one. In the illustrated example, M is equal to six. The modifying code further comprises the selection code which consists of first through N-th bits. The attribute code is delivered to the first through the N-th modifying circuits 21 to 2N. The selection code is delivered to a selecting circuit 30.

Figure 2:
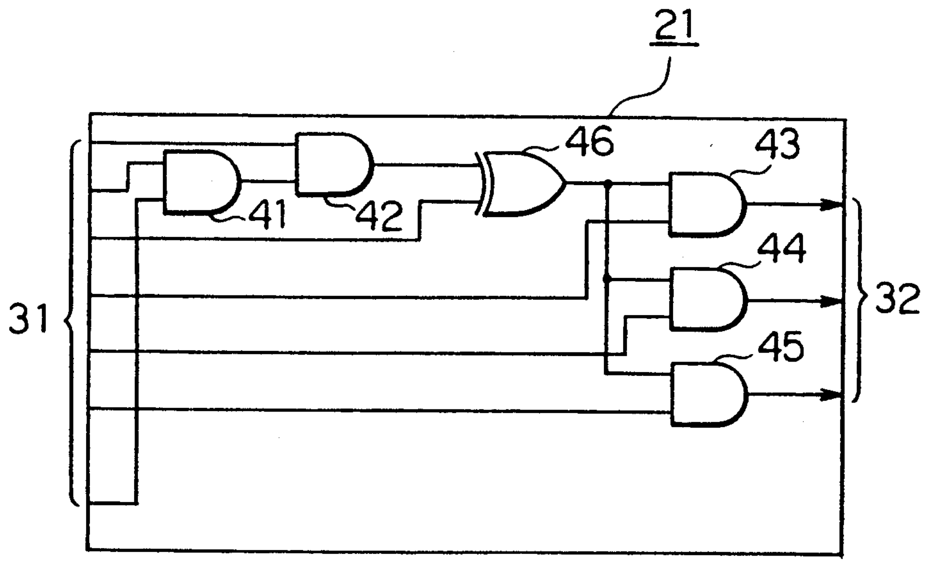
FIG. 2 is a logic circuit of one of modifying circuits illustrated in FIG. 1.

Referring to FIG. 2, the first modifying circuit 21 comprises an input selection 31 and an output section 32. The input section 31 has first through seventh input terminals which are successively numbered from the top of FIG. 2 to the bottom. The output section 32 has first through third output terminals which are numbered from the top of FIG. 2 to the bottom. The character pattern signal is supplied to the first input terminal. The first through sixth bits of the attribute code are supplied to the second through seventh input terminals, respectively.

The first modifying circuit 31 comprises first through fifth AND gates 41 to 45 and an exclusive 0R gate 46. The first AND gate 41 produces a first AND'ed signal in response to the first and the sixth bits of the attribute code to supply the first AND'ed signal to the second AND gate 42. The second AND gate 42 is supplied with the character pattern signal and the first AND'ed signal and produces a second AND'ed signal to supply the second AND'ed signal to the exclusive OR gate 46. The exclusive OR gate 46 produces an exclusive OR'ed signal in response to the second bit of the attribute code and the second AND'ed signal to supply the exclusive OR'ed signal to the third through the fifth AND gates 43 to 45. The third AND gate 43 produces a third AND'ed signal in response to the third bit of the attribute code and the exclusive OR'ed signal. The fourth AND gate 44 produces a fourth AND'ed signal in response to the fourth bit of the attribute code and the exclusive OR'ed signal. The fifth AND gate 45 produces a fifth AND'ed signal in response to the fifth bit of the attribute code and the exclusive OR'ed signal.

The third through fifth AND'ed signals are outputted from the first through third output terminals, respectively. The third through fifth AND'ed signals are collectively called a first modification signal.

The second through eighth modifying circuits 22 and 2N produce second through N-th modification signals like the first modifying circuit 21. The first through the N-th modification signals may be different from each other.

Turning back to FIG. 1, the selecting circuit 30 receives the first through N-th modification signals and selects at least one of the first through the N-th modification signals in response to the selection code. For example, the selecting circuit 30 selects the first modification signal as the modified signal when the first bit of the selection code represents a logic one. Similarly, the selecting circuit 30 selects the first and the third modification signals as the modified signal when the first and the third bits of the selection code represent the logic one, respectively.

The modified signal is supplied to a displaying unit 50 to be displayed as the modified character.

When the first memory 11 memorizes a plurality of character codes representative of characters, respectively, the second memory 12 memorizes a plurality of modifying codes, each of which corresponds to one of the character codes. The character codes and the modifying codes are read out of the first and the second memories 11 and 12 by address signals which are different from each other and which are supplied from the address generating circuit 13.

What is claimed is:

1. A modifying device for modifying a character into a modified signal, said modifying device comprising:

a first memory for memorizing a character code representative of said character;

a second memory for memorizing an attribute code and a selection code which cooperatively determine modification of said character;

supplying means for supplying an address signal to said first and said second memories to read out said character code, said attribute code, and said selection code;

a character pattern generating circuit responsive to the character code read out of said first memory for producing a character pattern;

first through N-th modifying means responsive to the attribute code read out of said second memory for modifying said character pattern into first through N-th modification signals, respectively, where N represents a positive integer which is not less than two; and selecting means for selecting at least one of said first through said N-th modification signals as said modified signal in response to the selection code read out of said second memory.

2. A character display system for generating and displaying characters selectively with or without one or more attributes comprising:

a first memory for storing character codes representative of characters which may be displayed;

a second memory for storing attribute codes and selection codes which cooperatively determine modification of characters which are displayed;

address means for supplying an address signal to said first and said second memories to read out character, attribute and selection codes;

character pattern generating means responsive to a character code read out of said first memory for producing a character pattern;

a plurality of modifying circuit means each receiving the character pattern from said character pattern generating means and an attribute code read out of said second memory for modifying said character pattern according to respectively different logical functions;

selecting means responsive to a selection code from said second memory for selecting outputs from one or more of said plurality of modifying circuit means to produce a modified character pattern according to both said attribute and selection codes; and a display device connected to said selecting means for displaying characters having said modified character pattern.

3. The character display system recited in claim 2 wherein attribute codes stored in said second memory comprise M bits, where M is greater than one.

4. The character display system recited in claim 3 wherein the number of said modifying circuit means is N, where N is not less than two, each of said modifying circuit means receiving said M attribute bits and a signal representing said character pattern from said character pattern generating means and generating different modifications of said signal.

* * * * *